(12) United States Patent
Hirota

(10) Patent No.: US 9,236,968 B2
(45) Date of Patent: Jan. 12, 2016

(54) COMMUNICATION DEVICE AND COMMUNICATION METHOD

(75) Inventor: Masaki Hirota, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 166 days.

(21) Appl. No.: 13/310,211

(22) Filed: Dec. 2, 2011

(65) Prior Publication Data

US 2012/0140776 A1 Jun. 7, 2012

(30) Foreign Application Priority Data

Dec. 3, 2010 (JP) ................................. 2010-270635

(51) Int. Cl.
*H04J 3/24* (2006.01)
*H04J 3/06* (2006.01)
*H04J 3/16* (2006.01)

(52) U.S. Cl.
CPC .......... *H04J 3/1617* (2013.01); *H04J 2203/006* (2013.01); *H04J 2203/0012* (2013.01); *H04J 2203/0021* (2013.01); *H04J 2203/0082* (2013.01)

(58) Field of Classification Search
CPC ............ H04J 3/1617; H04J 2203/0012; H04J 2203/0082; H04J 2203/006; H04J 2203/0021
USPC ......................................... 370/465, 474, 389
See application file for complete search history.

(56) References Cited

U.S. PATENT DOCUMENTS

| | | | |
|---|---|---|---|
| 6,888,839 B1* | 5/2005 | Scoggins et al. .............. | 370/410 |
| 7,315,511 B2 | 1/2008 | Morita et al. | |
| 7,715,374 B2* | 5/2010 | Masuya et al. ................ | 370/352 |
| 7,940,745 B2* | 5/2011 | Lobig ........................... | 370/352 |
| 2003/0091044 A1* | 5/2003 | DeMars et al. ............... | 370/389 |
| 2007/0038858 A1* | 2/2007 | Hughes ......................... | 713/168 |
| 2008/0183926 A1* | 7/2008 | Wingard et al. .............. | 710/105 |
| 2009/0046730 A1* | 2/2009 | Shimomura et al. .......... | 370/401 |
| 2010/0074265 A1 | 3/2010 | Masuya | |

FOREIGN PATENT DOCUMENTS

| | | |
|---|---|---|
| JP | 2002354011 A | 12/2002 |
| JP | 2003-134074 A | 5/2003 |
| JP | 2006041921 A | 2/2006 |
| JP | 2006-067040 A | 3/2006 |
| JP | 2008-178060 A | 7/2008 |
| JP | 2010-074629 A | 4/2010 |

OTHER PUBLICATIONS

Telcordia ("Synchronous Optical Network (SONET) Transport Systems; Common Generic Criteria", Document Code GR-253-CORE pp. i-xvii, 3-55 to 3-80, 5-107 to 5-103, published Dec. 2005).*
Telcordia, "Synchronous Optical Network Transport Systens; Common Generic Criteria", Document Code GR-253-CORE pp. i-vii, 3-55 to 3-80, 5-107 to 5-103 to 5-103 published Dec. 2005.*
Office Action issued Jul. 15, 2014 in Japanese Application No. 2010-270635 with partial English translation, 5 pages.

* cited by examiner

*Primary Examiner* — Andrew Lai
*Assistant Examiner* — Albert Shih
(74) *Attorney, Agent, or Firm* — Oblon, McClelland, Maier & Neustadt, L.L.P.

(57) ABSTRACT

A communication device includes a memory to store data and a processor to receive data, to convert the received data and a same data of the received data among the stored data into a predetermined format, and to transmit data resulting from the data conversion.

16 Claims, 16 Drawing Sheets

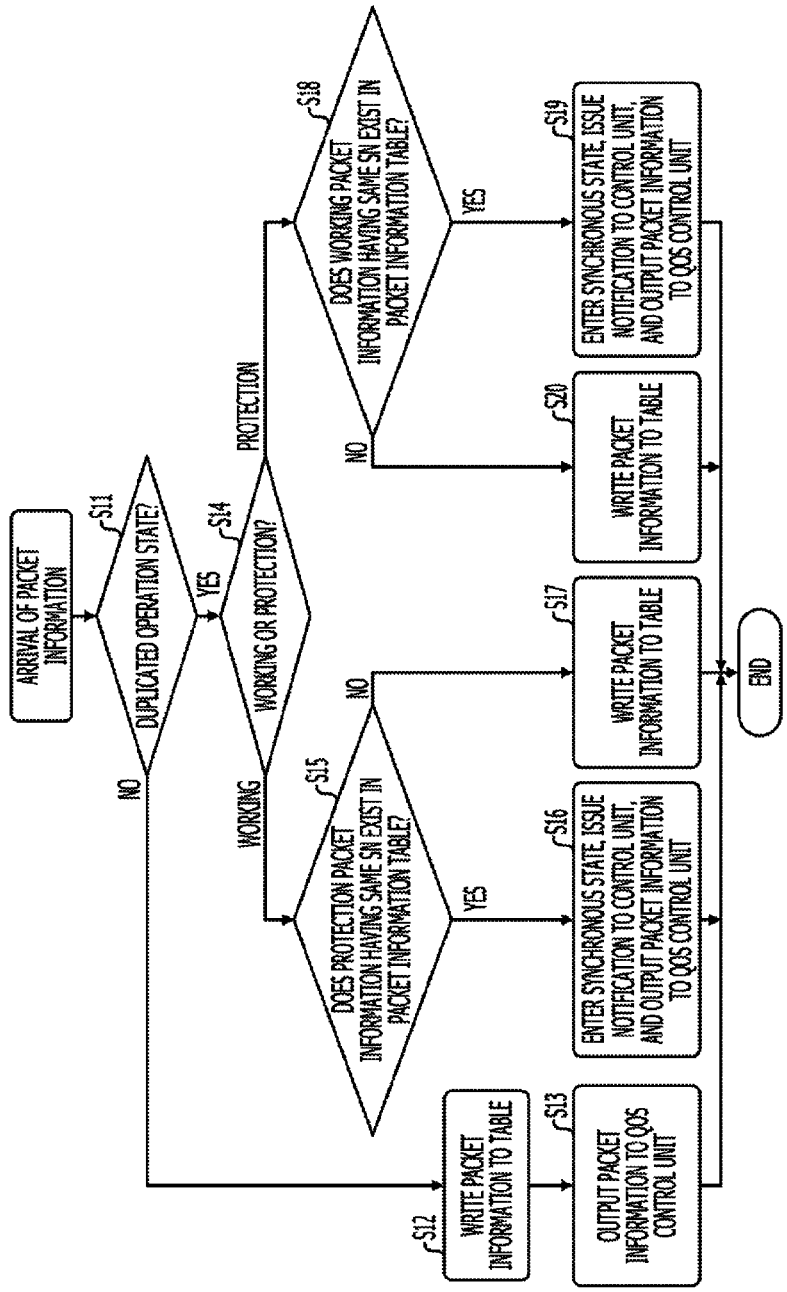

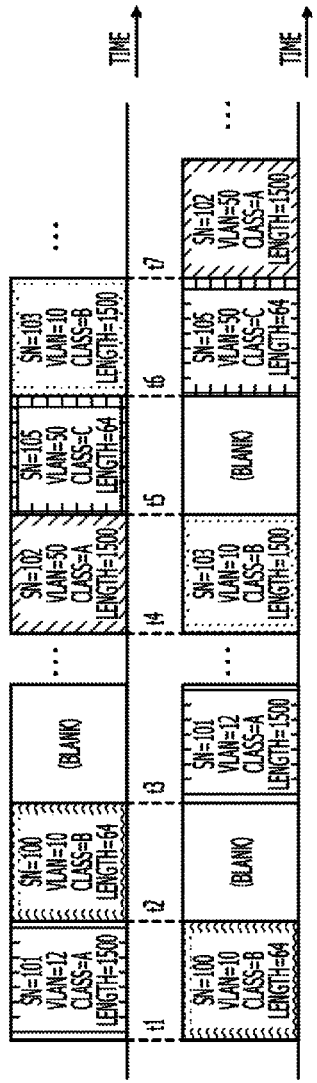

COMMUNICATION DEVICE AND COMMUNICATION METHOD

CROSS-REFERENCE TO RELATED APPLICATIONS

This application is based upon and claims the benefit of priority of the prior Japanese Patent Application No. 2010-270635, filed on Dec. 3, 2010, the entire contents of which are incorporated herein by reference.

FIELD

The disclosure herein relates to a communication device and a communication method.

BACKGROUND

With widespread use of the Internet and computers, the amounts of traffic of data systems increase in communication networks. Examples of the traffic of data systems include IP (internet protocol) packets and LAN (local area network) packets of Ethernet and so on.

Transfer of traffic for data systems for VPN (virtual private network) services and so on has brought about increases in the transfer speed and in the transfer data.

The reliability of communication devices for use in the VPN services has improved with a redundant function. The redundant function is to duplicate processing. During failure or maintenance of a working side, the communication device having the redundant function is capable of switching its operation to a protection side. Thus, the redundant function improves the reliability of the communication device.

For example, LAN links and TDM (time division multiplexing) links are available to transmit traffic. The TDM links employ, for example, SONET (synchronous optical network), SDH (synchronous digital hierarchy), PDH (plesiochronous digital hierarchy), and so on. OTN (Optical transport network) is a new TDM technology.

The LAN links are capable of directly transferring packets. The TDM links, however, use a mapper function to convey packets.

The mapper function provides a function for mapping packets onto TDM frames at an entrance of a TDM network. The mapper function further provides a function for retrieving packets from the TDM frame at an exit at the opposite end of the TDM network.

Examples of devices having a redundant function and a mapper function as described above will be described below.

Japanese Unexamined Patent Application Publication No. 2010-74629 discloses a packet synchronization switching method for a gateway device. This gateway device has an audio processing blade redundantly configured between an IP network and an SDH network. The gateway device further has a function for receiving a VoIP packet from the IP network, performing audio processing on the packet, and outputting an I-TDM packet to the SDH network. Such a gateway device receives reference timing and time information, performs audio processing in accordance with the reference timing, and performs system switching between audio processing blades in accordance with the time information.

Japanese Unexamined Patent Application Publication No. 2008-178060 discloses a technology in which any of gateway devices that receive packets supplies a TDM signal to a TDM network. Each gateway device receives a duplicated same packet and writes the packet to a buffer in accordance with a common write pointer for the packet. In addition, each gateway device sequentially reads written packets from the buffer and generates a TDM signal.

Japanese Unexamined Patent Application Publication No. 2003-134074 discloses a technology in which a SONET/SDH transmission device selectively switches between transmission paths. The SONET/SDH transmission device has redundant transmission lines constituted by two transmission lines. The SONET/SDH transmission device transmits a packet representing transmission-line switching control information to another transmission device through the transmission line(s). In accordance with a state of packet reception from the other transmission device, the SONET/SDH transmission device switches the transmission paths for transmitting a transmission signal.

Japanese Unexamined Patent Application Publication No. 2006-67040 discloses an interface converting device for converting a synchronization transfer signal into a packet signal. The interface converting device has a pair of a working port and a protection port adjacent to a packet network. The interface converting device further has duplicated pairs of path transmission lines. The interface converting device includes switching information in added information to be added to a TDM signal after multiplexing. The interface converting device then adds a packet-network destination header to a signal to which the added information is added.

SUMMARY

According to an aspect of the embodiment, a communication device includes a memory to store data and a processor to receive data, to convert the received data and a same data of the received data among the stored data into a predetermined format, and to transmit data resulting from the data conversion.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a flowchart illustrating a first example of synchronization determination processing according to the second embodiment;

FIG. 10A illustrates working packet information according to the synchronization determination processing according to the second embodiment;

FIG. 10B illustrates protection packet information according to the synchronization determination processing according to the second embodiment;

FIG. 10C illustrates a packet information table according to the synchronization determination processing according to the second embodiment;

DESCRIPTION OF EMBODIMENTS

Preferred embodiments of the present invention will be explained with reference to accompanying drawings.

[a] Exemplary Communication Device

In a VPN (virtual private network) service or the like, various data may coexist on a network. For example, audio, video, and so on generally require real-time transmission, which is highly susceptible to packet loss. In contrast, file transfer, web viewing, and so on permit certain degrees of delay and packet loss.

Accordingly, it is desired that a communication device that handles traffic for a data system be capable of dealing with various qualities of services.

Figure 1:
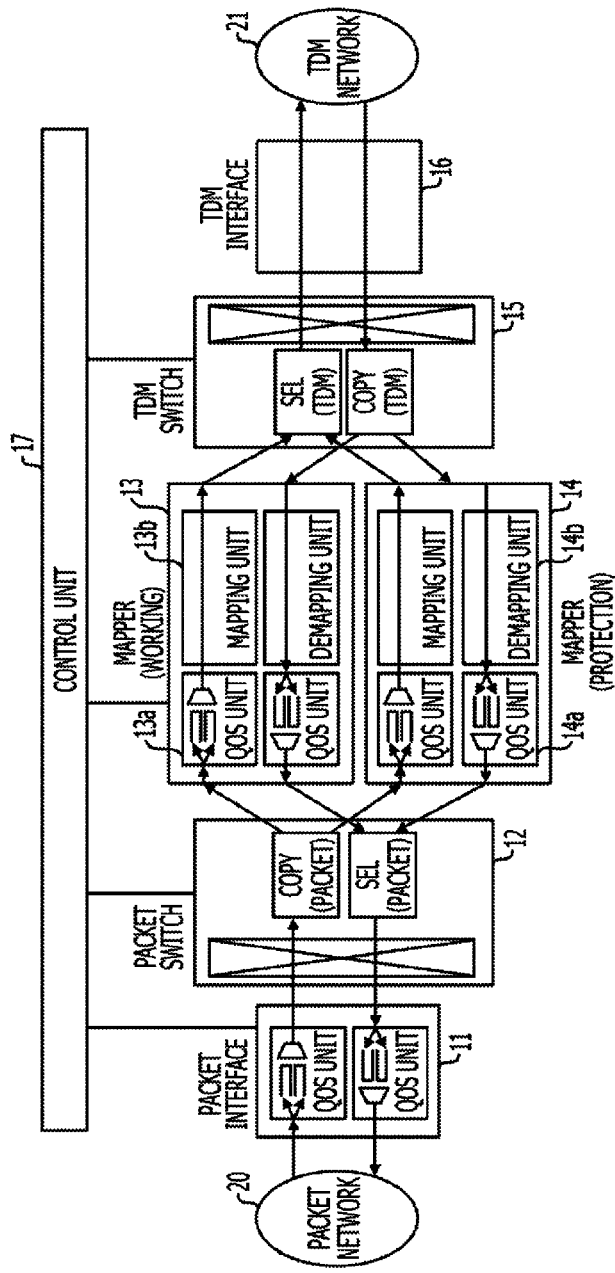
FIG. 1 is a block diagram of one example of a communication device.

FIG. 1 is a block diagram of a chassis-type communication device having a function for linking a packet network and a TDM (time-division multiplexing) network. A packet interface 11, a packet switch 12, a working mapper 13, a protection mapper 14, a TDM switch 15, a TDM interface 16, and a control unit 17 are incorporated into respective cards.

In the communication device, QOS units consider a quality of service (QOS). Each QOS unit rearranges input packets in order of priority and outputs the rearranged packets.

In a mapping direction, the packet interface 11 receives packets from a packet network 20 and the packet switch 12 copies each of the received packets and supplies the copied packet to the working mapper 13 and the protection mapper 14. The working mapper 13 and the protection mapper 14 map the packets onto TDM frames and output the resulting TDM frames, respectively. The TDM switch 15 selects one of the TDM frames and the TDM interface 16 transmits the selected TDM frame to a TDM network 21.

In a demapping direction, the TDM interface 16 receives a TDM frame from the TDM network 21 and the TDM switch 15 copies the TDM frame and supplies the TDM frame to the working mapper 13 and the protection mapper 14. The mappers 13 and 14 demap packets from the TDM frames and outputs the packets. The packet switch 12 selects the packet and the packet interface 11 transmits the selected packet to the packet network 20. The control unit 17 performs setting for each card by performing software operation and generates and supplies a low-speed clock and a frame pulse for each card by performing hardware operation. Lastly, the software determines which of the mappers 13 and 14 is to be used as a working mapper.

In the mapping direction, the communication device has the following problems.

The TDM switch 15 executes switching processing at timing of the border of TDM frames or the like. However, there is no guarantee that payloads of the TDM frames output from the two mappers 13 and 14 match each other exactly.

A first reason for the mismatch is that packets that flow through the mappers 13 and 14 are out of sync with each other.

Suppose, for example, that the communication device initially operates using only the working mapper 13 and then performs redundant operation using both of the working mapper 13 and the protection mapper 14.

In this case, a QOS unit 13a in the working mapper 13 is filled with packets. However, a QOS unit 14a in the working mapper 14 is empty. Thus, packets output to downstream mapping units 13b and 14b are not always the same packet.

Suppose, for example, that the communication device is in a state in which a buffer in the QOS unit 13a in the working mapper 13 is full.

In this case, the communication device performs back pressure control on the packet switch 12 to stop inputting. As a result of the back pressure control, there is a possibility that packets output from the QOS unit 13a and the QOS unit 14a differ from each other.

Suppose, for example, that after the redundant operation of the communication device, the control unit 17 changes the QOS setting.

During the change in the QOS setting, the control unit 17 does not perform setting for the working mapper 13 and the protection mapper 14 at the same time. The control unit 17 first performs setting for the working mapper 13 and then performs setting for the protection mapper 14. As a result of the change in the QOS setting, there is a possibility that packets output from the QOS units 13a and 14a in the mappers 13 and 14 differ from each other.

A second reason for the above-noted mismatch is that high-speed clocks used by the mappers 13 and 14 are out of sync with each other.

For example, in a chassis-type communication device that performs high-speed, large-volume processing, each card internally generates a high-speed clock (with a frequency of 300 MHz or the like) by multiplying a low-speed clock (with a frequency of 38 MHz or the like) supplied from the control unit 17.

Thus, although the low-speed clocks supplied from the control unit 17 synchronize with each other, not all of the phases of the high-speed clocks perfectly synchronize with each other.

Suppose, in this case, certain processing is externally triggered on the working and protection mappers 13 and 14 at the same time.

If, however, the mappers 13 and 14 are out of sync with each other, the mappers 13 and 14 do not necessarily always capture the processing at the same clock phase. When the high-speed clocks of the mappers 13 and 14 are out of sync with each other, the working mapper 13 and the protection mapper 14 perform packet processing involving QOS at exactly the same phase (timing).

Figure 2:
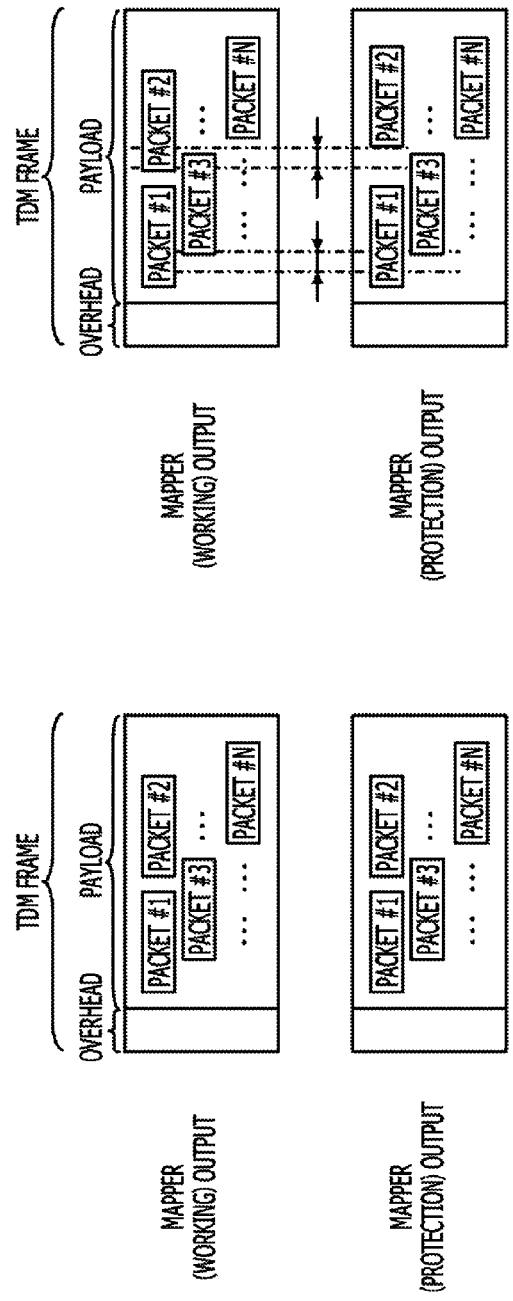
FIG. 2A illustrates examples of TDM frames output by working and protection mappers.
FIG. 2B illustrates examples of TDM frames output by the working and protection mappers.

FIG. 2A illustrates TDM frames respectively output from the mappers 13 and 14. The first reason discussed above yields a difference between the TDM frame output from the working mapper 13 and the TDM frame output from the protection mapper 14, as illustrated in FIG. 2A.

FIG. 2B illustrates TDM frames respectively output from the mappers 13 and 14. The second reason discussed above yields a difference between the TDM frame output from the working mapper 13 and the TDM frame output from the protection mapper 14, as illustrated in FIG. 2B.

As described above, there is no guarantee that payloads of the TDM frames output from the two mappers 13 and 14 match each other exactly. Thus, the above-described communication device involves interruptions during switching between the working mapper and the protection mapper.

The problems discussed above are not problems found only in communication devices used for VPN services. The problems discussed above could occur in any communication devices that perform communication.

In addition, communication devices that encounter the above-described problems are not limited to chassis-type communication devices having a function for linking a packet network and a TDM network. The above-described problems could similarly occur in any communication devices that perform communication.

[b] First Embodiment of the Communication Device

Figure 3:
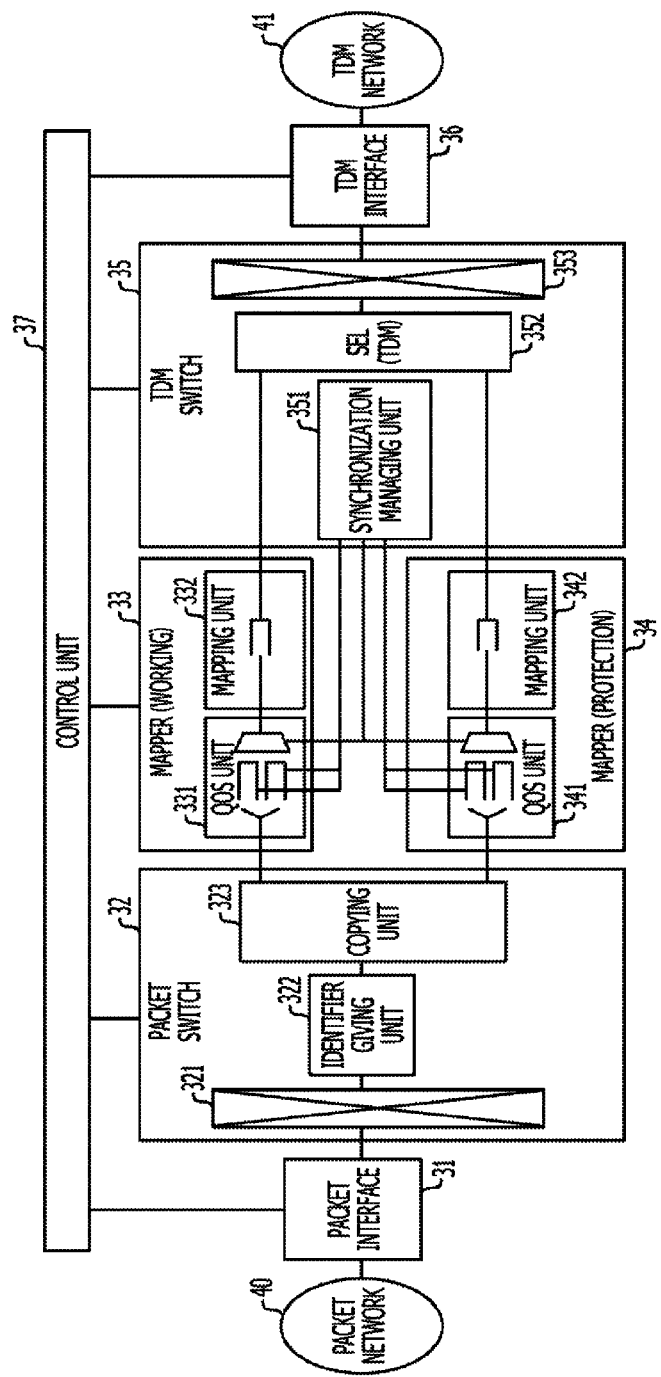
FIG. 3 is a block diagram of a communication device according to a first embodiment.

FIG. 3 is a block diagram illustrating a first embodiment of the communication device. The embodiment illustrated in FIG. 3 corresponds to a case in the mapping direction.

A packet interface 31, a packet switch 32, mappers 33 and 34, a TDM switch 35, a TDM interface 36, and a control unit 37 are incorporated into respective cards.

For example, ICs (integrated circuit) composed of processors, memories, etc. execute functions of the packet interface 31, the packet switch 32, the mapper 33, the mapper 34, the TDM switch 35, the TDM interface 36, and the control unit 37 respectively and are installed on the respective cards.

The packet interface 31 receives packets from a packet network 40 and supplies the received packets to the packet switch 32.

In the packet switch 32, the received packets are supplied to an identifier giving unit 322 via a switching unit 321 and the identifier giving unit 322 gives an identifier to each packet. In the packet switch 32, a copying unit 323 copies each packet given the identifier and supplies the packet to the mappers 33 and 34.

In this communication device, the mapper 33 serves as a working mapper and the mapper 34 serves as a protection mapper. The identifier giving unit 322 may also be eliminated as described below.

The mappers 33 and 34 store, in corresponding buffers in QOS units 331 and 341, the packets supplied from the packet switch 32. The QOS units 331 and 341 in the mappers 33 and 34 retrieve pieces of packet information for writing with respect to the corresponding packets stored in the corresponding buffers. Examples of each piece of packet information for writing include the identifier, QOS information, and the packet length of the corresponding packet. Each of the mappers 33 and 34 then supplies, for each packet, the piece of packet information to a synchronization managing unit 351 in the TDM switch 35. The synchronization managing unit 351 may be provided in another card, for example, the card of the control unit 37, not in the card of the TDM switch 35.

The synchronization managing unit 351 stores the packet information supplied from the mappers 33 and 34. When it is determined that the same packet is stored in the mappers 33 and 34, the synchronization managing unit 351 determines that this packet is readable from the mappers 33 and 34.

However, when multiple readable packets exist, the synchronization managing unit 351 determines which packet is to be first read considering the priority of classes, the fairness of users, or the like, on the basis of the QOS information of each packet. The synchronization managing unit 351 regards the result of the determination as a final readable packet.

The synchronization managing unit 351 calculates a mapping position (a byte position) for mapping each packet into the payload of the TDM frame. This calculation is based on the packet length of each packet permitted to be read by the mapper 33 or 34. The synchronization managing unit 351 supplies packet designation information and mapping position information to the mappers 33 and 34 as a piece of packet information for reading. The packet designation information designates a packet to be read. The mapping position information specifies the mapping position of the packet.

The card of the control unit 37 distributes a common low-speed frame pulse to both of the mappers 33 and 34. Thus, the TDM frames output from the mappers 33 and 34 are synchronous with each other.

The packets are read from the respective QOS units 331 and 341 in accordance with the packet designation information and the mapping units 332 and 342 map the read packets on the TDM frames, respectively, in accordance with the mapping position information in the packet information.

The TDM frames output from the respective mappers 33 and 34 are supplied to a selector (SEL) 352 in the TDM switch 35. The selector 352 selects one of the "working" TDM frame and the "protection" TDM frame and outputs the selected TDM frame. The TDM frame output from the selector 352 is switched by a switching unit 353 and is sent from the TDM interface 36 to a TDM network 41.

The control unit 37 performs setting for each card by performing software operation and generates and supplies a low-speed clock and a frame pulse for each card by performing hardware operation. Lastly, the software determines which of the mappers 33 and 34 is to be used as a working mapper.

As described above, the communication device causes synchronization of the timings of packets processed by the mappers 33 and 34 and the timings at which the packets are mapped onto corresponding TDM frames, thereby allowing the payloads of the TDM frames output from the working and protection mappers 33 and 34 to match each other. This allows the communication device to uninterruptedly perform duplicated switching between the working mapper 33 and the protection mapper 34 by using the TDM switch 35.

For such uninterrupted switching, the synchronization managing unit 351 may store and process packet information of about a few to ten bytes per packet. Thus, the amount of buffer in the synchronization managing unit 351 is reduced.

In the communication device, the packet information for writing and the packet information for reading are exchanged between the mappers 33 and 34 and the TDM switch 35. However, the amount of the packet information for writing and reading is considerably small compared to the amount of information of main signals (the received packets). Accordingly, the exchange of the packet information is sufficiently feasible using signals having lower speed than the main signals.

[c] Second Embodiment of the Communication Device

Figure 4:
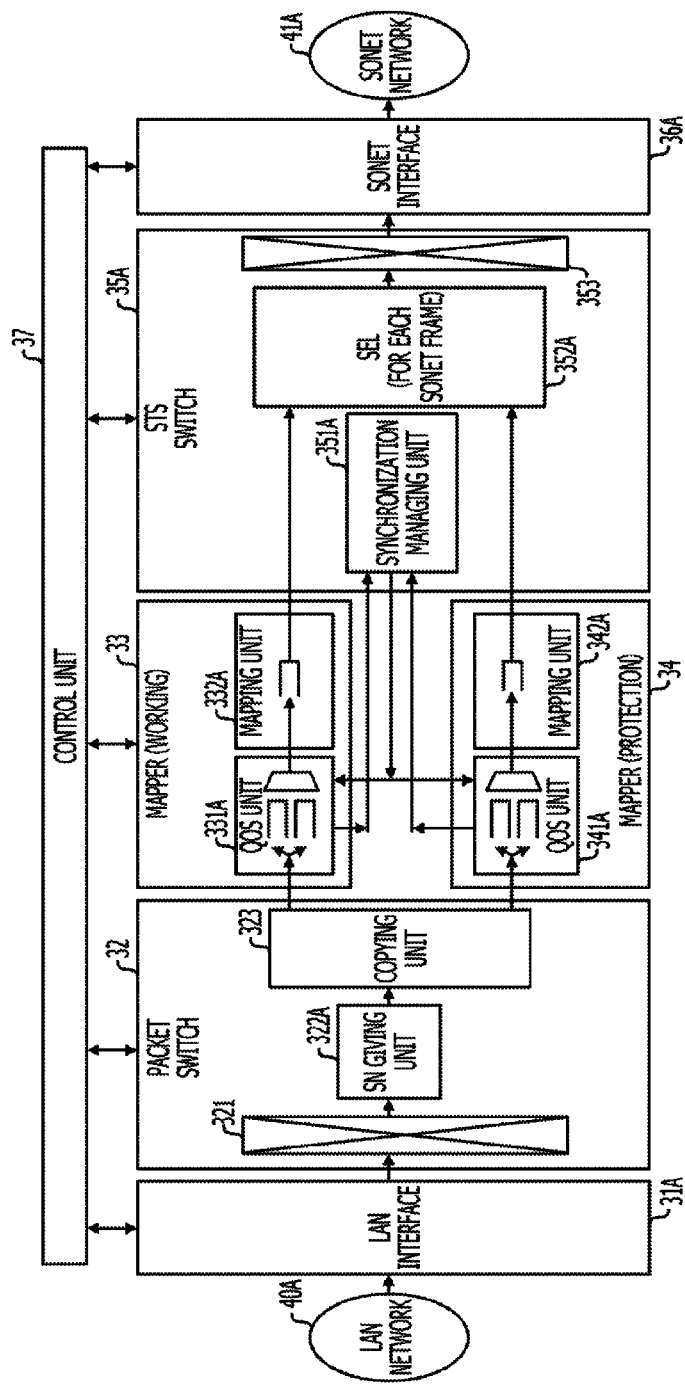
FIG. 4 is a block diagram of a communication device according to a second embodiment.

FIG. 4 is a block diagram illustrating a second embodiment of the communication device. The embodiment illustrated in FIG. 4 corresponds to a case in the mapping direction.

The communication device in FIG. 4 is different from the communication device in FIG. 3 in that the packet network 40 is implemented by a LAN (local area network) 40A such as Ethernet, the TDM network 41 is implemented by a SONET network 41A, and the packet interface 31 is implemented by a LAN interface 31A.

The identifier giving unit 322 is replaced with an SN giving unit 322A. The SN giving unit 322A generates a sequence number (SN) for each packet, determines a packet length, and gives the sequence number serving as an identifier, along with the packet length, to each packet.

Further, the mapping units 332 and 342 in the mappers are replaced with mapping units 332A and 342A. Each of the mapping units 332A and 342A maps a LAN packet onto a SONET STS3c frame.

Synchronization managing unit 351A is substantially similar to the synchronization managing unit 351 disclosed in FIG. 3. However, for example, synchronization managing unit 351A calculates a mapping position (a byte position) for mapping each packet into the payload of the SONET STS frame. This calculation is based on the packet length of each packet permitted to be read by the mapper 33 or 34. The synchronization managing unit 351 supplies packet designation information and mapping position information to the mappers 33 and 34 as a piece of packet information for reading. The packet designation information designates a packet to be read. The mapping position information specifies the mapping position of the packet.

The TDM switch 35 is replaced with an STS (synchronous transport signal) switch 35A.

The TDM interface 36 is replaced with a SONET interface 36A. The selector 352A selects one of the "working" SONET frame and the "protection" SONET frame and outputs the selected SONET frame. The SONET frame output from the selector 352A is switched by a switching unit 353 and is sent from the SONET interface 36A to a SONET network 41A.

The LAN interface 31A, the packet switch 32, the mapper 33, the mapper 34, the STS switch 35A, and the SONET interface 36A are incorporated into respective cards. Respective ICs composed of processors, memories, etc. execute functions of the cards. In addition, respective functions of the SN giving unit 322A, the QOS unit 331A, the QOS unit 341A, the mapping unit 332A, the mapping unit 342A, and the selector 352A may be executed, for example, by a processor, such as a microprocessor or the like.

Figure 5:
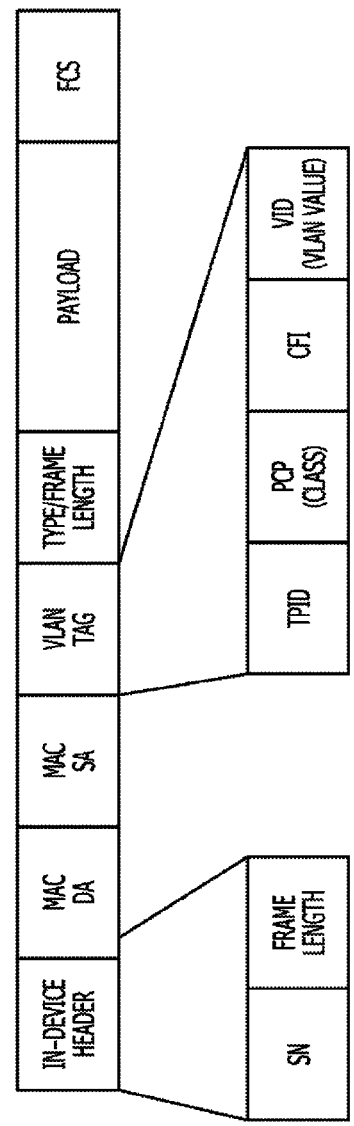
FIG. 5 illustrates an in-device frame according to the second embodiment.

FIG. 5 is a diagram illustrating the format of an in-device frame according to the second embodiment of the communication device.

The in-device frame corresponds to a packet output by the SN giving unit 322A.

An in-device header at the beginning of the frame has a sequence number (SN) and a frame length given by the SN giving unit 322A.

A MAC DA is a MAC destination address and a MAC SA is a MAC source address.

A VLAN (virtual local area network) tag has a TPID (type identifier), a PCP (class), a CFI (canonical format indicator), and a VID (VLAN value).

A type/frame length is a type value or a frame length. Payload is arbitrary data. FCS is frame-error check data.

[c.1] One Example of QOS Unit According to Second Embodiment

Figure 6:
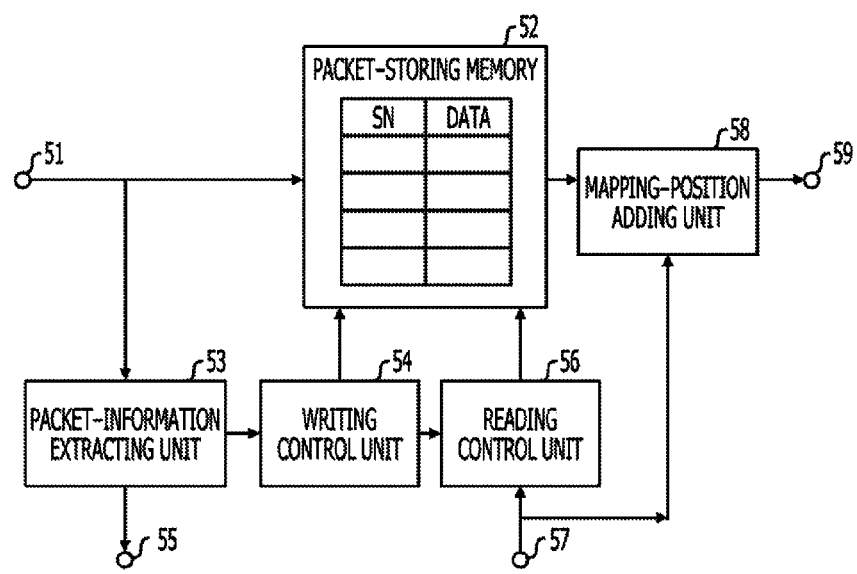
FIG. 6 is a block diagram according to a QOS unit of the second embodiment.

FIG. 6 is a block diagram illustrating a first example of the QOS units 331A and 341A. The QOS unit illustrated in FIG. 6 is applicable to the second embodiment (FIG. 4) of the communication device.

The packet information extraction unit 53, the writing control unit 54, the reading control unit 56, and the mapping position giving unit are, for instance, processors, such as microprocessors or the like. In addition, respective processes, executed by the packet information extraction unit 53, the writing control unit 54, the reading control unit 56, and the mapping position adding unit 58, are executed by processors such as microprocessors or the like. Moreover, the packet storage memory 52 is composed of memories, such as flash memories or the like.

A main signal (a packet of the in-device frame) is supplied from the copying unit 323 to a terminal 51. The packet supplied to the terminal 51 is further supplied to a packet-storing memory 52 and a packet-information extracting unit 53.

Figure 7:
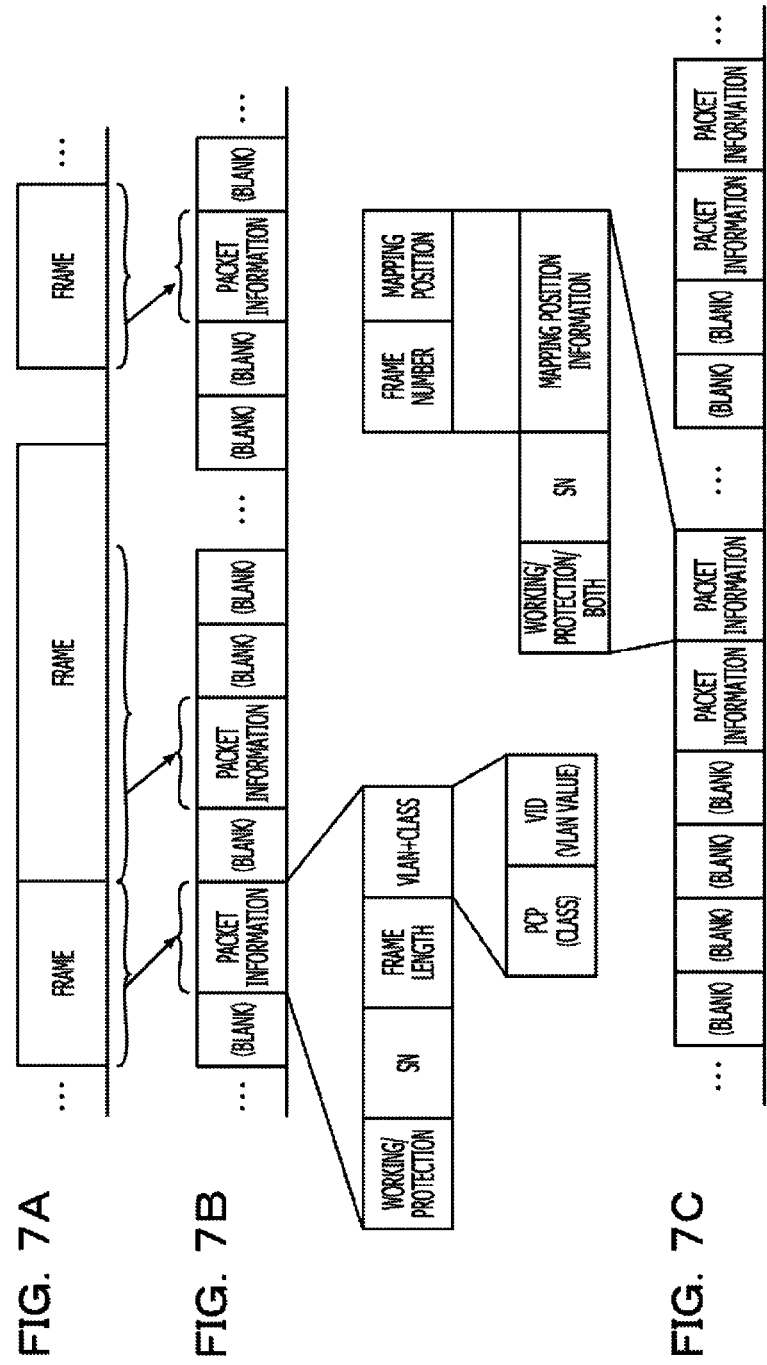
FIG. 7A illustrates a main signal according to the QOS unit of the second embodiment.
FIG. 7B illustrates packet information for writing according to the QOS unit of the second embodiment.
FIG. 7C illustrates packet information for reading according to the QOS unit of the second embodiment.

FIG. 7A illustrates a main signal supplied to the QOS units 331A and 341A. That is, a main signal as illustrated in FIG. 7A is supplied to the terminal 51.

The packet-information extracting unit 53 extracts the packet sequence number (SN), the frame length, the class, and the VLAN value from the supplied packet. The packet-information extracting unit 53 adds a working/protection flag to the extracted information to generate a piece of packet information. The working/protection flag indicates whether the supplied packet is a working packet or a protection packet. The packet-information extracting unit 53 supplies the generated packet information to the synchronization managing unit 351A (not illustrated in FIG. 6) via a terminal 55.

The packet-information extracting unit 53 also supplies the sequence number of each packet to a writing control unit 54.

FIG. 7B illustrates the format of the packet information for writing, the packet information being output by the packet-information extracting unit 53.

The writing control unit 54 generates a write address for the packet-storing memory 52 on the basis of the sequence number supplied from the packet-information extracting unit 53. The writing control unit 54 supplies the generated write address to the packet-storing memory 52. This allows the packet-storing memory 52 to regard the sequence number as an address. That is, the packets of main signals are sequentially stored at addresses corresponding to the sequence numbers, the addresses being included in the packet-storing memory 52.

The packet information for reading is supplied from the synchronization managing unit 351A to the reading control unit 56 via a terminal 57. The reading control unit 56 generates an address based on the above-described packet designation information in the packet information. The reading control unit 56 reads the packet corresponding to the address from the packet-storing memory 52.

The packet read from the packet-storing memory 52 is supplied to a mapping-position adding unit 58. The mapping-position adding unit 58 adds the mapping position information to the read packet. The mapping-position adding unit 58 outputs the packet information with the mapping position information to the mapping unit via a terminal 59.

FIG. 7C illustrates the format of the packet information for reading according to the first configuration of the QOS units 331A and 341A. The packet information for reading is supplied from the synchronization managing unit 351A. The packet information for reading contains a working/protection flag (ACT/STBY), a sequence number (SN) serving as the packet designation information, a frame number (a SONET frame number) serving as the mapping position information, and an in-frame mapping position.

Figure 8:
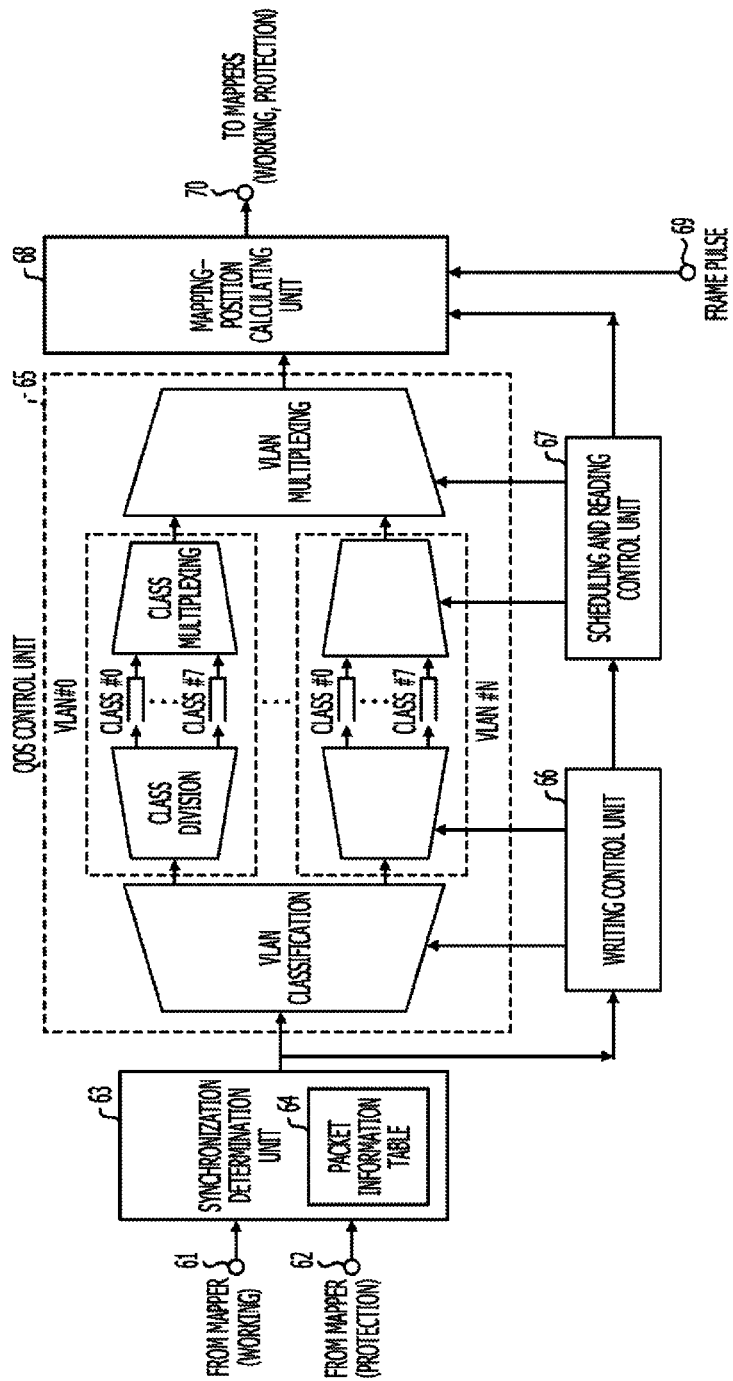
FIG. 8 is a block diagram according to a synchronization managing unit of the second embodiment.

[c.2] One Example of the Synchronization Managing Unit According to Second Embodiment FIG. 8 is a diagram illustrating a first configuration of the synchronization managing unit 351A. The synchronization managing unit illustrated in FIG. 8 is applicable to the second embodiment (FIG. 4) of the communication device.

The synchronous judgment unit 63, the QOS control unit 65, the mapping position calculation unit 68, and the scheduling and reading control unit 67 are composed of processors, such as microprocessors or the like. Respective processes executed by the synchronous judgment unit 63, the QOS control unit 65, the mapping position calculation unit 68, the scheduling, and reading control unit 67 are executed, for instance, by processors, such as microprocessors or the like. Moreover, the packet information table 64 is composed of memories, such as flash memories or the like.

The pieces of packet information for writing are supplied from the working and protection mappers to terminals 61 and 62, respectively. The pieces of packet information for writing are further supplied from the terminals 61 and 62 to a synchronization determination unit 63.

The synchronization determination unit 63 has a packet information table 64. The packet information table 64 contains pieces of packet information, with the sequence numbers thereof being used as search keys. The synchronization determination unit 63 writes the pieces of packet information, output from the working and protection mappers to the packet information table 64.

In this case, both of the working and protection mappers output pieces of packet information regarding the same packet. Thus, the synchronization determination unit 63 writes, to the packet information table 64, the piece of packet information that arrives earlier out of the pieces of packet information having the same sequence number. Upon arrival of the other piece of packet information later, the synchronization determination unit 63 reads the earlier piece of packet information from the packet information table 64 and outputs the read piece of packet information to a downstream QOS control unit 65.

[c.2.1a] One Example of Synchronization Determination Processing According to Second Embodiment FIG. 9 is a flowchart of a first example of synchronization determination processing executed by a synchronization determination unit 63. This processing may be executed by the synchronization determination unit 63 in the first configuration (FIG. 8) of the synchronization managing unit 351A.

The following process that the synchronous judgment unit 63 executes is executed by processors, such as microprocessors or the like.

This processing is started each time the packet information is supplied to the synchronization determination unit 63.

In operation S11, the synchronization determination unit 63 determines whether or not the communication device is in a duplicated operation state. The duplicated operation state refers to a state in which the same packet is supplied from the mappers 33 and 34. In other words, the duplicated operation state refers to a state in which uninterrupted switching is possible after the communication device enters the synchronous state.

When the communication device is not in the duplicated operation state, i.e., the communication device is in a single-channel operation state, the process proceeds to operation S12 in which the synchronization determination unit 63 writes the supplied packet information to the packet information table 64, since packet information having the same sequence number as the sequence number of the supplied packet information does not exist in the packet information table 64.

In operation S13, since the communication device is in the single-channel operation, the synchronization determination unit 63 reads the protection packet information from the packet information table 64 and outputs the read packet information to the downstream QOS control unit 65.

Although the supplied packet information is temporarily written to the packet information table 64 in operation S12 described above, operation S12 may be eliminated so that the supplied packet information is directly output to the downstream QOS control unit 65.

On the other hand, when the communication device is in the duplicated operation state, the process proceeds to operation S14 in which the synchronization determination unit 63 uses the working/protection flag in the supplied packet information to determine whether the packet information is working packet information or protection packet information.

When the supplied packet information is working packet information, the process proceeds to operation S15 in which the synchronization determination unit 63 determines whether or not protection packet information having the same sequence number as the sequence number of the supplied packet information exists in the packet information table 64.

When protection packet information having the same sequence number exists in the packet information table 64, the process proceeds to operation S16 in which the synchronization determination unit 63 enters the synchronous state and issues a notification to the control unit 37. The synchronization determination unit 63 reads the protection packet information from the packet information table 64 and outputs the read packet information to the downstream QOS control unit 65.

When protection packet information having the same sequence number does not exist in the packet information table 64, the process proceeds to operation S17 in which the synchronization determination unit 63 writes the supplied working packet information to the packet information table 64.

On the other hand, when it is determined in operation S14 that the supplied packet information is protection packet information, the process proceeds to operation S18 in which the synchronization determination unit 63 determines whether or not working packet information having the same sequence number as the sequence number of the supplied packet information exists in the packet information table 64.

When working packet information having the same sequence number exists in the packet information table 64, the process proceeds to operation S19 in which the synchronization determination unit 63 enters the synchronous state and issues a notification to the control unit 37. The synchronization determination unit 63 reads the working packet information from the packet information table 64 and outputs the read packet information to the downstream QOS control unit 65.

When working packet information having the same sequence number does not exist in the packet information table 64, the process proceeds to operation S20 in which the synchronization determination unit 63 writes the supplied protection packet information to the packet information table 64.

The first example (FIG. 9) of the synchronization determination processing will now be described with reference to examples illustrated in FIGS. 10A to 10C. FIGS. 10A and 10B illustrate examples of the pieces of packet information in the first embodiment of the synchronization determination processing and FIG. 10C illustrates an example of the packet information table. The pieces of packet information and the packet information table are not limited to those illustrated in FIGS. 10A to 10C.

FIG. 10A illustrates the working packet information in operation S15 in the first example of the synchronization determination processing.

FIG. 10B illustrates the protection packet information in operation S18 in the first example of the synchronization determination processing.

FIG. 10C illustrates the packet information table in operations S15 and S18 in the first example of the synchronization determination processing.

At time t1, working packet information with sequence number 101 and protection packet information with sequence number 100 are supplied to the synchronization determination unit 63. The synchronization determination unit 63 stores the received pieces of packet information in the packet information table 64.

At time t2, working packet information with sequence number 100 is supplied to the synchronization determination unit 63. At this point, the synchronization determination unit 63 reads the protection packet information with sequence number 100 from the packet information table 64. The synchronization determination unit 63 supplies the read information to the QOS control unit 65.

At time t3, protection packet information with sequence number 101 is supplied to the synchronization determination unit 63. At this point, the synchronization determination unit 63 reads the working packet information with sequence number 101 from the packet information table 64. The synchronization determination unit 63 supplies the read packet information to the QOS control unit 65.

Similarly, at time t4, working packet information with sequence number 102 and protection packet information with sequence number 103 are supplied to the synchronization determination unit 63. The synchronization determination unit 63 stores the received pieces of packet information in the packet information table 64.

At time t5, working packet information with sequence number 105 is supplied to the synchronization determination unit 63. The synchronization determination unit 63 stores the received piece of packet information in the packet information table 64.

At time t6, working packet information with sequence number 103 and protection packet information with sequence number 105 are supplied to the synchronization determination unit 63. At this point, the synchronization determination unit 63 reads, from the packet information table 64, the protection packet information with sequence number 103 and the working packet information with sequence number 105. The synchronization determination unit 63 supplies the read pieces of packet information to the QOS control unit 65.

At time t7, protection packet information with sequence number 102 is supplied to the synchronization determination unit 63. At this point, the synchronization determination unit 63 reads the working packet information with sequence number 102 from the packet information table 64. The synchronization determination unit 63 supplies the read packet information to the QOS control unit 65.

[c.2.2] One Example of QOS Control Unit According to Second Embodiment

Referring back to FIG. 8, the packet information output by the synchronization determination unit 63 is supplied to the QOS control unit 65 and a writing control unit 66.

The QOS control unit 65 sorts the pieces of packet information according to the VLAN values. The QOS control unit 65 has buffers for the respective classes.

Under the control of the writing control unit 66, each piece of packet information supplied to the QOS control unit 65 is written to the buffer corresponding to the VLAN value and the class in the packet information.

A scheduling and reading control unit 67 reads one piece of packet information from the pieces of packet information, stored in the buffers in the QOS control unit 65, in accordance with scheduling of giving priority to a higher-priority class. The scheduling and reading control unit 67 supplies the read packet information to a mapping-position calculating unit 68.

The order of priority of the classes is class A, class B, and class C. The priority of class A is the highest.

The QOS control unit (the QOS control unit 65 in FIG. 8) will now be described with reference to FIGS. 11A and 11B.

Figure 11A:
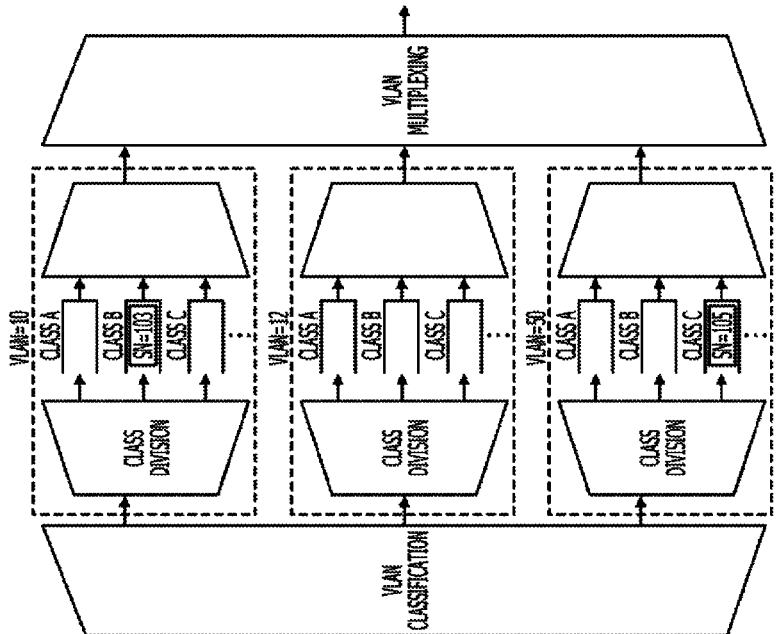
FIG. 11A is a diagram illustrating a state before the QOS control unit according to the synchronization managing unit performs processing according to the second embodiment.

FIG. 11A is a diagram illustrating a state before the QOS control unit in the first configuration of the synchronization managing unit performs processing.

Figure 11B:
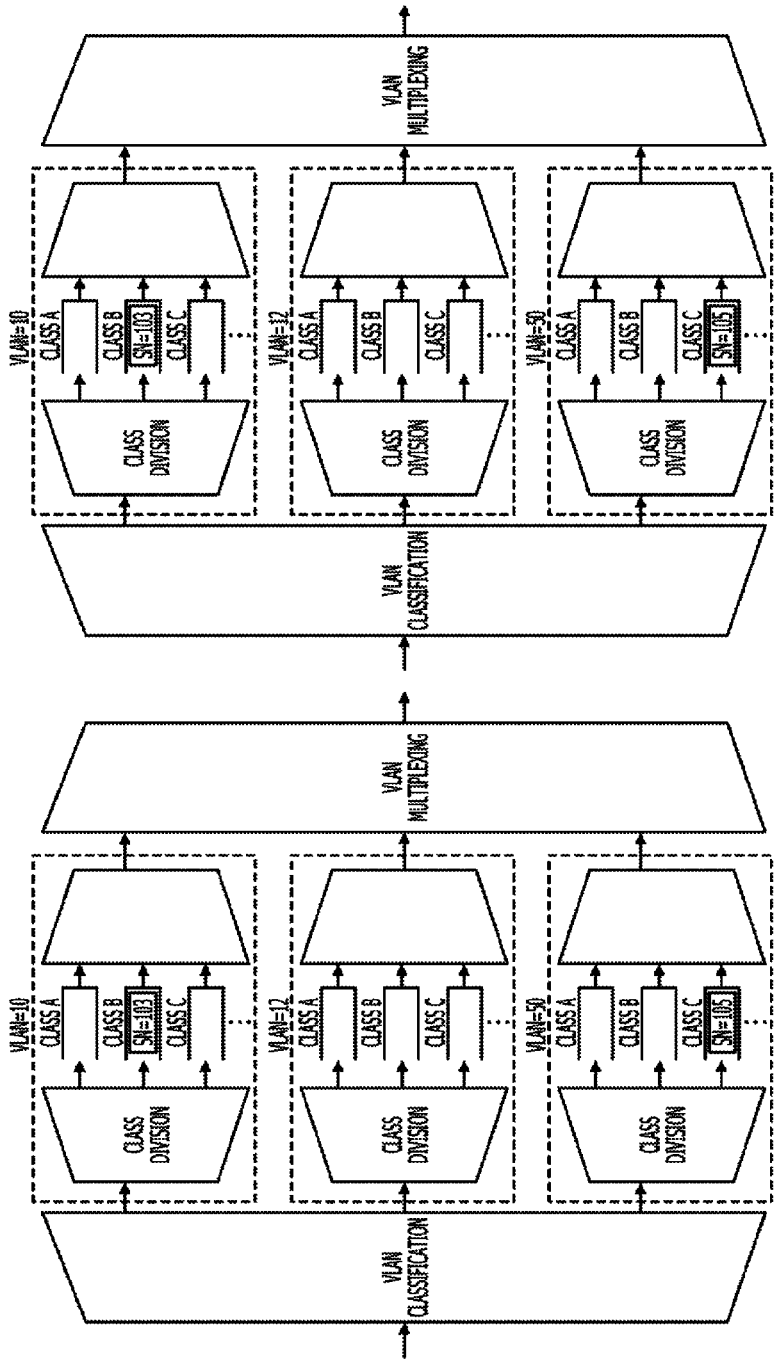
FIG. 11B is a diagram illustrating a state after the QOS control unit according to the synchronization managing unit performs processing according to the second embodiment.

FIG. 11B is a diagram illustrating a state after the QOS control unit in the first configuration of the synchronization managing unit performs processing.

As illustrated in FIG. 11A, the QOS control unit 65 stores packet information with sequence number 103 in the buffer for VLAN "10" and class B. The QOS control unit 65 stores packet information with sequence number 105 in the buffer for VLAN "50" and class C.

In this case, as illustrated in FIG. 11B, under the control of the scheduling and reading control unit 67, the QOS control unit 65 first reads the packet information with sequence number 103 from the higher-priority buffer for VLAN "10" and class B and outputs the read packet information.

The QOS control unit (the QOS control unit 65 in FIG. 8) will be further described with reference to FIGS. 12A and 12B.

Figure 12A:
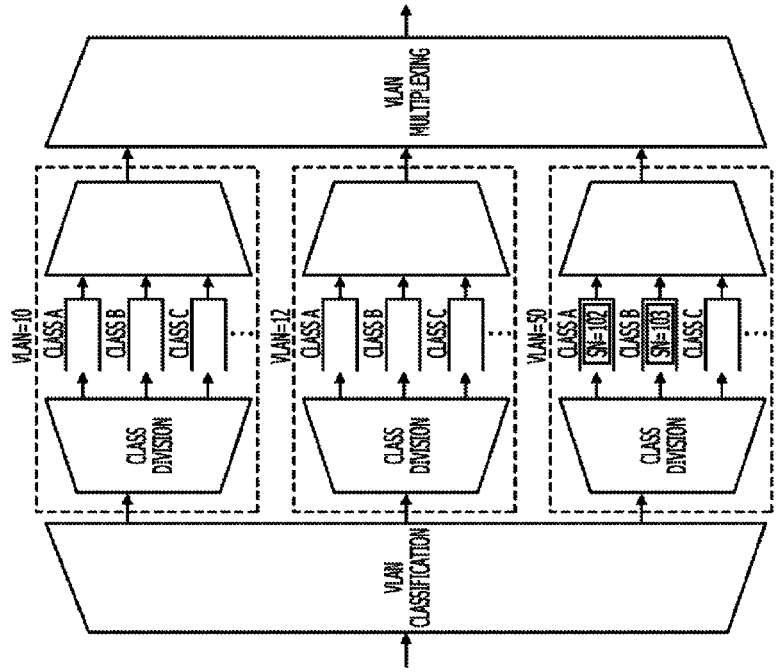
FIG. 12A is a diagram illustrating one example of the QOS control unit according to according to the second embodiment.

As illustrated in FIG. 12A, the QOS control unit 65 stores packet information with sequence number 102 in the buffer for VLAN "50" and class A. The QOS control unit 65 stores packet information with sequence number 103 in the buffer for VLAN "50" and class B.

Figure 12B:
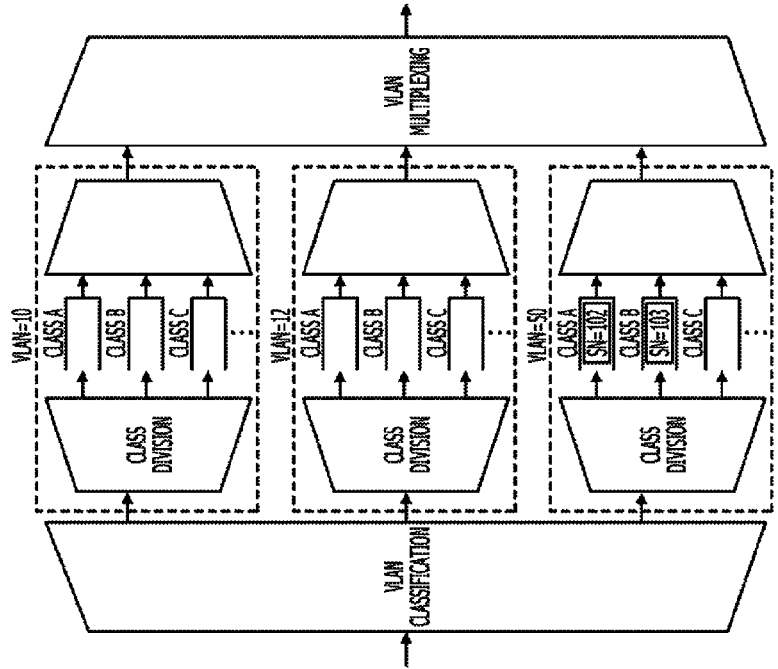
FIG. 12B is a diagram illustrating one example of the QOS control unit according to the second embodiment.

In this case, as illustrated in FIG. 12B, under the control of the scheduling and reading control unit 67, the QOS control unit 65 first reads the packet information with sequence number 102 from the higher-priority buffer for VLAN "50" and class A and outputs the read packet information.

[c.2.3] One Example Mapping-Position Calculating Unit According to Second Embodiment Referring now to FIG. 8, for example, a frame pulse with a period of 125 μsec is supplied from the control unit 37 to the mapping-position calculating unit 68 via a terminal 69. The frame pulse with a period of 125 μsec indicates a front end of an STS3c frame.

On the basis of the frame length of the pieces of packet information sequentially supplied from the QOS control unit

65, the mapping-position calculating unit 68 calculates the frame number of the STS3c frame and a first position at which packets of the STS3c frame are to be mapped. That is, the mapping-position calculating unit 68 calculates a mapping position on the basis of the frame length. The mapping-position calculating unit 68 adds the frame number and the mapping position to the corresponding packet information supplied from the QOS control unit 65 and supplies the resulting packet information to the mappers 33 and 34 via a terminal 70.

Figure 13:
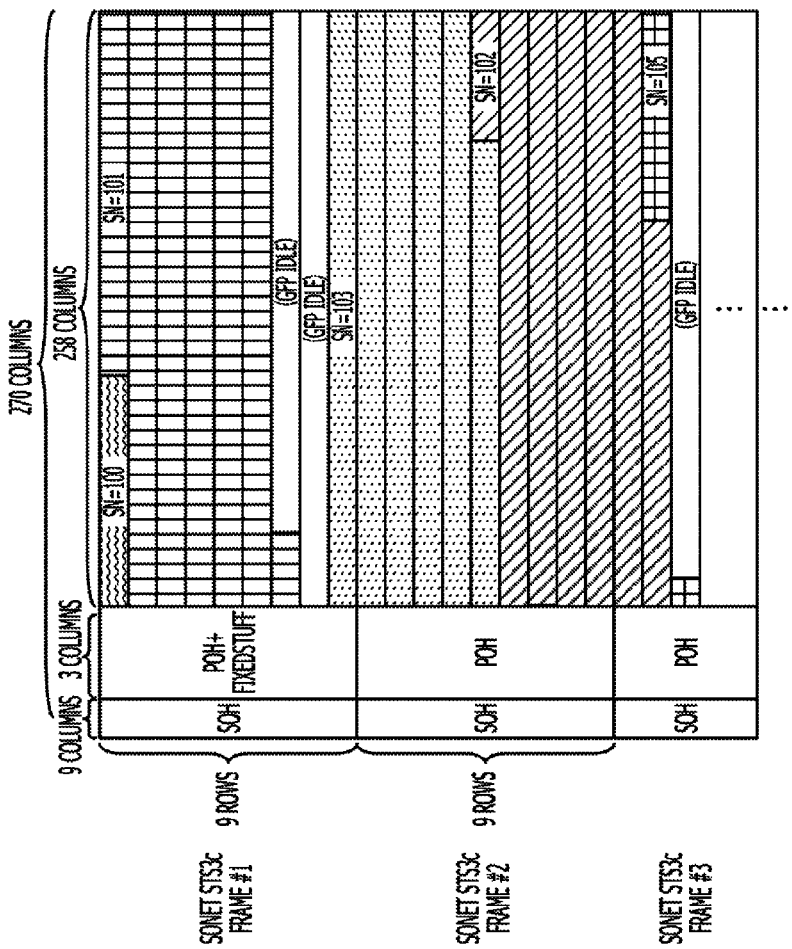
FIG. 13 illustrates one example of mapping-position calculation according to the synchronization determination processing according to the second embodiment.

FIG. 13 illustrates the mapping-position calculation processing performed by the mapping-position calculating unit 68 in the first configuration of the synchronization managing unit 351A.

In this case, the packets with sequence numbers 100, 101, 103, 102, and 105 are encapsulated into GFP (generic framing procedure) frames in that order and are mapped.

The packet with sequence number 100 (with a frame length of 64 bytes) has a mapping position at the 13th byte in a frame with frame number 1. The next packet with sequence number 101 (with a frame length of 1500 bytes) has a mapping position at the 85th byte in the frame with frame number 1.

This mapping position is obtained by adding the overhead (8 bytes) of the GFP frame to the frame length (64 bytes) of the packet with sequence number 100.

The packet with sequence number 101 is followed by a blank area (GFP idle). Subsequent to the blank area, the packet with sequence number 103 (with a frame length of 1500 bytes) has a mapping position at the 2173rd byte in the frame with frame number 1. In addition, the packet with sequence number 102 (with a frame length of 1500 bytes) has a mapping position at the 4321st byte in a frame with frame number 2. The packet with sequence number 105 (with a frame length of 64 bytes) has a mapping position at the 737th byte in a frame with frame number 3.

The processing (in FIG. 13) performed by the mapping-position calculating unit 68 in the first configuration of the synchronization determination unit 63 will now be described with reference to FIGS. 14A to 14C.

Figures 14A, 14B, 14C:
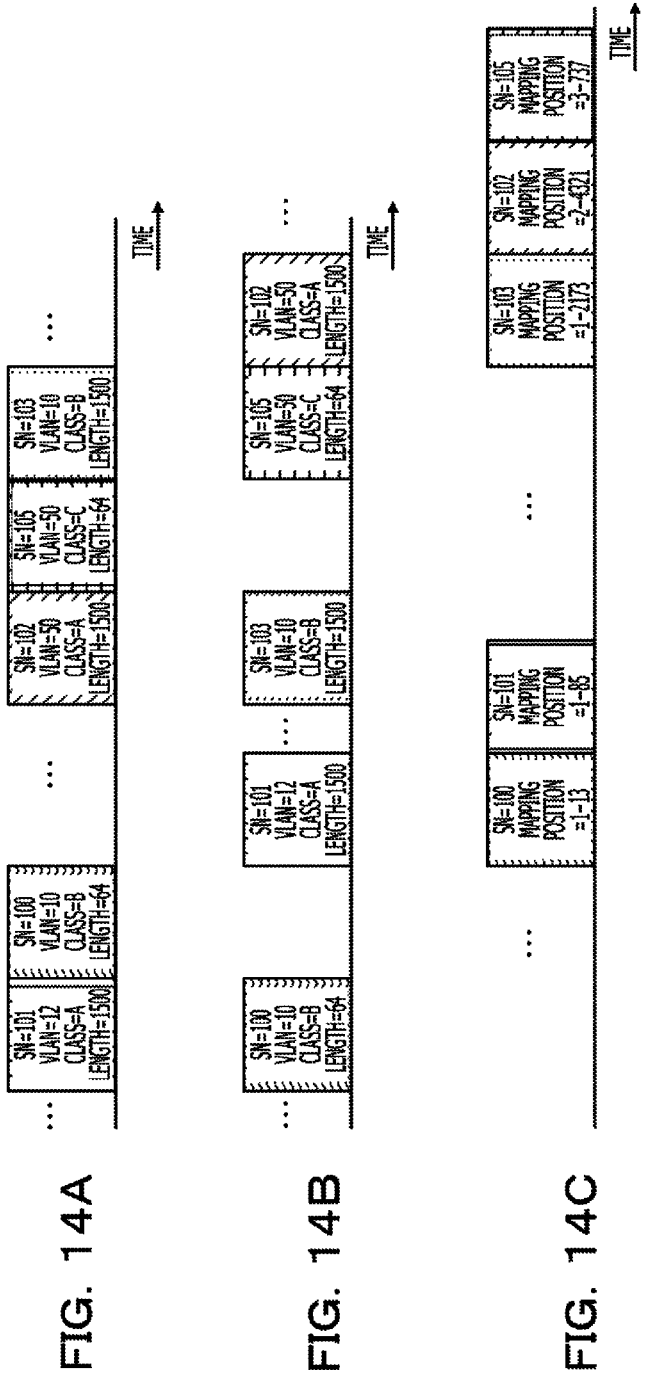
FIG. 14A illustrates one example of packet information according to the synchronization determination processing according to the second embodiment.
FIG. 14B illustrates one example of packet information according to the synchronization determination processing according to the second embodiment.
FIG. 14C illustrates one example of packet information according to the synchronization determination processing according to the second embodiment.

FIG. 14A illustrates working packet information supplied to the synchronization determination unit 63 in the first configuration of the synchronization managing unit 351.

FIG. 14B illustrates protection packet information supplied to the synchronization determination unit 63 in the first configuration of the synchronization managing unit 351.

FIG. 14C illustrates packet information output from the mapping-position calculating unit 68 in the first configuration of the synchronization managing unit 351.

FIGS. 14A and 14B are substantially the same as FIGS. 10A and 10B.

As illustrated in FIG. 14C, when the same packet information is supplied from the working and protection mappers 33 and 34 to the synchronization determination unit 63, it outputs the packet information to the QOS control unit 65.

The QOS control unit 65 sequentially retrieves the packet information in descending order of priority.

The mapping-position calculating unit 68 gives a frame number and a mapping position to each piece of the packet information and outputs the resulting packet information. Mapping position=1-13 (in FIG. 14C) of the packet with sequence number 100 represents the 13th byte in the frame with frame number 1.

Figure 15:
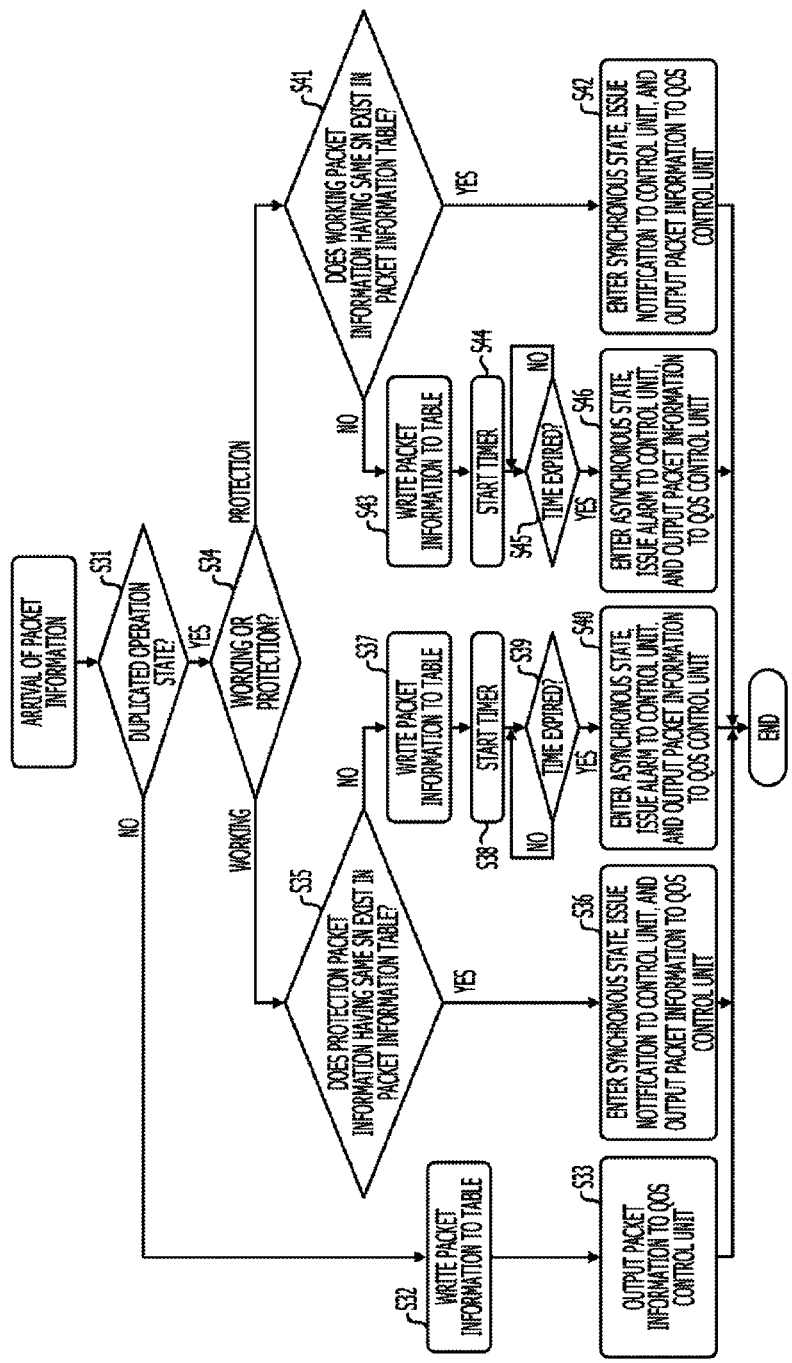
FIG. 15 is a flowchart illustrating a second example of the synchronization determination processing according to the second embodiment.

[c.2.1b] One Example of Synchronization Determination Processing According to Second Embodiment FIG. 15 is a flowchart of a second example of the synchronization determination processing executed by the synchronization determination unit 63. This processing is started each time the packet information is supplied to the synchronization determination unit 63 via the terminals 61 and 62.

For instance, the following process that the synchronous judgment unit 63 executes is executed by processors, such as microprocessors or the like. Moreover, the packet information table 64 is composed of memories, such as flash memories or the like.

In operation S31, the synchronization determination unit 63 determines whether or not the communication device is in a duplicated operation state.

When the communication device is not in the duplicated operation state, i.e., the communication device is in a single-channel operation state, the process proceeds to operation S32 in which the synchronization determination unit 63 writes the supplied packet information to the packet information table 64, since packet information having the same sequence number as the sequence number of the supplied packet information does not exist in the packet information table 64.

In operation S33, since the communication device is in the single-channel operation state, the synchronization determination unit 63 reads the packet information from the packet information table 64 and outputs the read packet information to the downstream QOS control unit 65.

Although the supplied packet information is temporarily written to the packet information table 64 in operation S32 described above, operation S32 may be eliminated so that the supplied packet information is directly output to the downstream QOS control unit 65.

On the other hand, when the communication device is in the duplicated operation state, the process proceeds to operation S34 in which the synchronization determination unit 63 uses the working/protection flag in the supplied packet information to determine whether the packet information is working packet information or protection packet information.

When the supplied packet information is working packet information, the process proceeds to operation S35 in which the synchronization determination unit 63 determines whether or not protection packet information having the same sequence number as the sequence number of the supplied packet information exists in the packet information table 64.

When protection packet information having the same sequence number exists in the packet information table 64, the process proceeds to operation S36 in which the synchronization determination unit 63 enters the synchronous state and issues a notification to the control unit 37. Thereafter, the synchronization determination unit 63 reads the protection packet information from the packet information table 64 and outputs the read packet information to the downstream QOS control unit 65.

When protection packet information having the same sequence number does not exist in the packet information table 64, the process proceeds to operation S37 in which the synchronization determination unit 63 writes the supplied working packet information to the packet information table 64.

In operation S38, the synchronization determination unit 63 starts a timer. In operation S39, the synchronization determination unit 63 determines whether or not the time is expired. When protection packet information having the same sequence number is supplied within a predetermined period of time after the completion of the processing in operation S37, the synchronization determination unit 63 maintains the synchronous state without time expiration and finishes the processing.

When protection packet information having the same sequence number is not supplied within a predetermined period of time, the process proceeds to operation S40 in which the synchronization determining unit 63 enters an asynchronous state and issues an alarm to the control unit 37. The synchronization determination unit 63 then reads the packet information from the packet information table 64 and outputs the read packet information to the downstream QOS control unit 65.

On the other hand, when it is determined in operation S34 that the supplied packet information is protection packet information, the process proceeds to operation S41 in which the synchronization determination unit 63 determines whether or not working packet information having the same sequence number as the sequence number of the supplied packet information exists in the packet information table 64.

When working packet information having the same sequence number exists in the packet information table 64, the process proceeds to operation S42 in which the synchronization determination unit 63 enters the synchronous state and issues a notification to the control unit 37. The synchronization determination unit 63 reads the working packet information from the packet information table 64 and outputs the read packet information to the downstream QOS control unit 65.

When working packet information having the same sequence number does not exist in the packet information table 64, the process proceeds to operation S43 in which the synchronization determination unit 63 writes the supplied protection packet information to the packet information table 64.

In operation S44, the synchronization determination unit 63 starts a timer. In operation S45, the synchronization determination unit 63 determines whether or not the time is expired. When working packet information having the same sequence number is supplied within a predetermined period of time after the completion of the processing in operation S43, the synchronization determination unit 63 maintains the synchronous state without time expiration and finishes the processing.

When working packet information having the same sequence number is not supplied within the predetermined period of time, the time is expired and the process proceeds to operation S46 in which the synchronization determining unit 63 enters the asynchronous state and issues an alarm to the control unit 37. The synchronization determination unit 63 reads the packet information from the packet information table 64 and outputs the read packet information to the downstream QOS control unit 65.

Upon receiving the alarm, the control unit 37 performs duplicated switching control so that the mapper that sent the packet information to the synchronization determination unit 63 earlier becomes a working mapper. In this case, when the mapper that sent the packet information earlier is already a working mapper, the control unit 37 does not perform switching. Conversely, when the mapper that sent the packet information earlier is a protection mapper, the control unit 37 performs switching.

[d] Modification of Packet Identifier

In the embodiment described above, the sequence number is used as the packet identifier.

The packet identifier, however, may be an FCS (frame check sequence).

The FCS is error detection information contained in each LAN packet. When the value of the header or payload in the LAN packet is different, the FCS value also varies. Thus, the FCS may also be used as the packet identifier.

The FCS is a value originally included in each LAN packet. Thus, when the FCS is used, the SN giving unit 322A (FIG. 4) in the communication device may be eliminated. In such a case, the QOS units 331 and 341 and the synchronization managing unit 351 perform processing using the FCS in place of the sequence number.

The packet identifier may also be a hash value. The hash value is obtained by performing hash calculation using a part of the received packet.

In this case, SN giving unit 322A (FIG. 4) of the communication device is eliminated and corresponding hash calculating units are provided immediately subsequent to the terminals 51 of the mappers 33 and 34. Each hash calculating unit adds a hash value.

An IP packet lacks the FCS, unlike the LAN packet. Thus, when the hash values obtained by the hash calculating units provided in the mappers 33 and 34 are used to identify packets, the identifier giving unit 322 may be eliminated from the communication device.

[e] Modification of Packet Information

In the above-described embodiment, during mapping of LAN packets onto a SONET frame, the communication device encapsulates the packets into a GFP frame. In this case, an overhead of an 8-byte fixed length is added to each LAN packet.

However, an overhead for encapsulation using an HDLC (high level data link control procedures) method, such as X.86, is 9 bytes. The HDLC method employs a 0x7E pattern (0x indicates a hexadecimal representation) at the beginning and the end. Thus, in the HDLC method, 1 byte of 0x7E in a LAN packet to be encapsulated is replaced with 2 bytes of 0x7D and 0x5E.

In this case, the frame length after the encapsulation is not equal to a value obtained by simply adding 9 bytes to the LAN frame length. That is, the frame length is further increased according to the number of 0x7E patterns contained in the LAN packet.

When the mappers 33 and 34 perform encapsulation using the HDLC method to map packets onto SONET frames, each of the packet-information extracting units 53 for the QOS units 331 and 341 in the mappers 33 and 34 counts the number of appearances of the 0x7E pattern in the LAN packet. The packet-information extracting unit 53 then adds the counted number of appearances to the packet information and transfers the resulting information to the synchronization managing unit 351.

Figure 16:
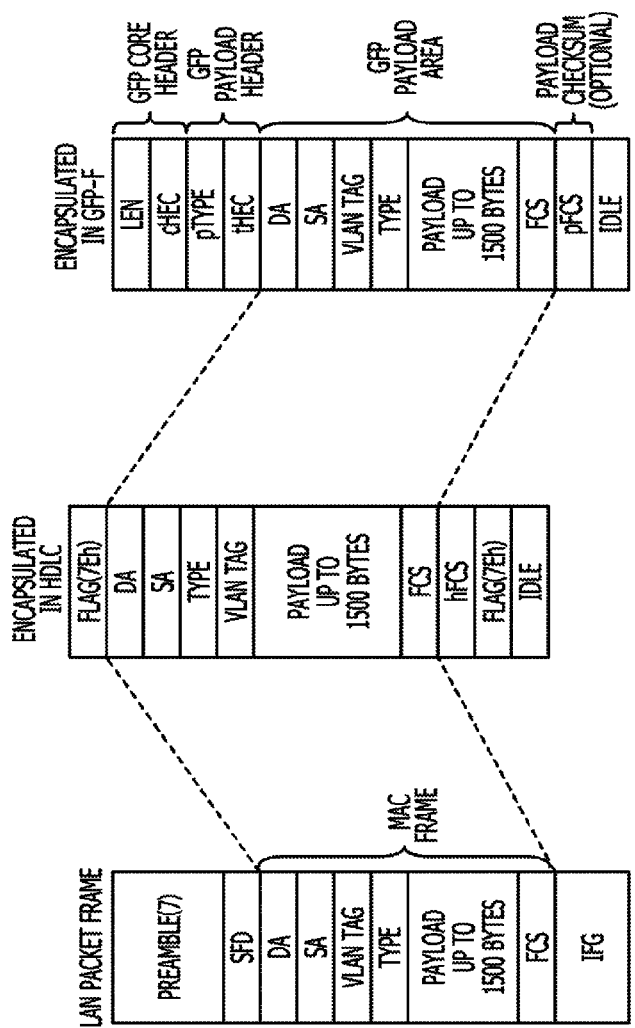
FIG. 16 illustrates encapsulation using an HDLC method and encapsulation using a GFP.

The synchronization managing unit 351 calculates a mapping position, by taking the number of appearances of the 0x7E pattern into account. FIG. 16 illustrates LAN packet encapsulation using the HDLC method and encapsulation using the GFP. In FIG. 16, the 0x7E pattern is represented as 7Eh.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   circuitry configured to
      receive packets via a communication interface;
      control storing each of the packets in corresponding queues of a working path in accordance with a priority corresponding to each of the packets;
      control storing a copied packet corresponding to each of the packets in corresponding queues of a protection path in accordance with the priority corresponding to each of the packets out of synchronization with a timing of the storing each of the packets in the corresponding queues of the working path;
      determine whether a packet and a copied packet identified by a same identifier are stored in each of one of the queues of the working path and one of the queues of the protection path;
      prioritize packets having the same identifier stored in the queues of the working path and the queues of the protection path based on a priority control and the priority corresponding to the packets;
      convert a packet identified by the same identifier into another format in accordance with order complying with the priority control; and
      transmit a converted data resulting from the conversion.

2. The communication device according to claim 1, wherein, the same identifier is a sequence number.

3. The communication device according to claim 1, wherein the same identifier is error detection information.

4. The communication device according to claim 1, wherein the same identifier is a result of a given calculation on the packet.

5. The communication device according to claim 1, wherein, when it is determined that a packet and a copied packet identified by the same identifier are not stored in each of one of the queues of the working path and one of the queues of the protection path, the circuitry is configured to convert another packet having lower priority than priority of the packet identified by the same identifier into the another format and transmit the converted other data.

6. The communication device according to claim 1, wherein, when a data length varies in a specific pattern while the circuitry converts packet identified by the same identifier into the another format, the circuitry is configured to convert the packet identified by the same identifier into the another format on a basis of information regarding the specific pattern.

7. The communication device according to claim 1, wherein the circuitry is configured to determine whether the packet and the copied packet corresponding to a same identifier are stored based on first information representing each of the packets stored by the storing and second information representing the copied packet stored by the storing.

8. The communication device according to claim 1, wherein the priority control controls priorities of each of the packets stored in the queues of the working path and priorities of each of the copied packets stored in corresponding queues of the protection path.

9. The communication device according to claim 1, wherein the circuitry includes
   first circuitry supplied with a specific clock and configured to execute the storing of each of the packets in corresponding queues of the working path according to a first clock created by multiplying the specific clock, and
   second circuitry supplied with the specific clock and configured to execute the storing of the copied packet according to a second clock created by multiplying the specific clock.

10. The communication device according to claim 9, wherein the first circuitry is a card and the second circuitry is another card independent of the first circuitry.

11. A communication method comprising:
    receiving packets via a communication interface;
    controlling storing each of the packets in corresponding queues of working path in accordance with a priority corresponding to each packet;
    controlling storing a copied packet corresponding to each of the packets in corresponding queues of a protection path in accordance with the priority corresponding to each of the packets out of synchronization with a timing of the storing each of the packets in the corresponding queues of the working path;
    determining whether a packet and a copied packet identified by a same identifier are stored in each of one of the queues of the working path and one of the queues of the protection path;
    prioritizing packets having the same identifier stored in the queues of the working path and the queues of the protection path based on a priority control and the priority corresponding to the packets;
    converting a packet identified by the same identifier into another format in accordance with order complying with the priority control; and
    transmitting a converted data resulting from the conversion.

12. The communication method according to claim 11, wherein the determining includes determining whether the packet and the copied packet corresponding to a same identifier are stored based on first information representing each of the packets stored by the storing and second information representing the copied packet stored by the storing.

13. The communication method according to claim 11, wherein the priority control controls priorities of each of the packets stored in the queues of the working path and priorities of each of the copied packets stored in corresponding queues of the protection path.

14. The communication method according to claim 11, wherein the method is performed by circuitry including
    first circuitry supplied with a specific clock and configured to execute the storing of each of the packets in corresponding queues of the working path according to a first clock created by multiplying the specific clock, and
    second circuitry supplied with the specific clock and configured to execute the storing of the copied packet according to a second clock created by multiplying the certain clock.

15. The communication method according to claim 14, wherein the first circuitry is a card and the second circuitry is another card independent of the first circuitry.

16. A control unit comprising:
    a terminal; and
    a processor configured to;
       control receiving packets via a communication interface;
       control storing each of the packets in corresponding queues of a working path in accordance with a priority corresponding to each of the packets;
       control storing a copied packet corresponding to each of the packets in corresponding queues of a protection path in accordance with the priority corresponding to each of the packets out of synchronization with a timing of the storing each of the packets in the corresponding queues of the working path;
control determining whether a packet and copied packet identified by a same identifier are stored in each of one of the queues of the working path and one of the queues of the protection path;
prioritize packets having the same identifier stored in the queues of the working path and the queues of the protection path based on a priority control and the priority corresponding to the packets;
control converting a packet identified by the same identifier into another format in accordance with order complying with the priority control.

\* \* \* \* \*